United States Patent
Ito

(10) Patent No.: US 8,228,565 B2
(45) Date of Patent: Jul. 24, 2012

(54) IMAGE READER, IMAGE PROCESSING APPARATUS AND IMAGE FORMING APPARATUS

(75) Inventor: Yukio Ito, Tokyo (JP)

(73) Assignee: Oki Data Corporation, Tokyo (JP)

( * ) Notice: Subject to any disclaimer, the term of this patent is extended or adjusted under 35 U.S.C. 154(b) by 461 days.

(21) Appl. No.: 12/502,503

(22) Filed: Jul. 14, 2009

(65) Prior Publication Data
US 2010/0073736 A1    Mar. 25, 2010

(30) Foreign Application Priority Data
Sep. 19, 2008    (JP) ................. 2008-240701

(51) Int. Cl.
*H04N 1/04*    (2006.01)

(52) U.S. Cl. ......... 358/474; 358/408; 358/475; 358/496

(58) Field of Classification Search ............ 358/474, 358/408, 475, 496, 497, 498, 505
See application file for complete search history.

(56) References Cited

U.S. PATENT DOCUMENTS
2009/0251739 A1*  10/2009  Cook et al. ............. 358/474

FOREIGN PATENT DOCUMENTS

| JP | 06-194751 | * | 7/1994 |
|---|---|---|---|
| JP | A-H7-84233 | | 3/1995 |
| JP | A-2004-42166 | | 2/2004 |
| JP | 2005-244755 A | | 9/2005 |
| JP | A-2007-67966 | | 3/2007 |

* cited by examiner

*Primary Examiner* — Houshang Safaipour
(74) *Attorney, Agent, or Firm* — Posz Law Group, PLC

(57) ABSTRACT

An image reader includes a platen, a display section and a reading section. The platen holds a document thereon. The display section displays a display image and is located on the platen. The reading section reads a document image of the document placed on the platen and is provided in opposition to the platen.

15 Claims, 16 Drawing Sheets

IMAGE READER, IMAGE PROCESSING APPARATUS AND IMAGE FORMING APPARATUS

CROSS REFERENCE TO RELATED APPLICATIONS

This application claims priority based on 35 USC 119 from prior Japanese Patent Application No. P2008-240701 filed on Sep. 19, 2008, the entire contents of which are incorporated herein by reference.

BACKGROUND

This application relates to an image reader. Additionally, the application also relates to an image processing apparatus or an image forming apparatus that includes the image reader.

A known image processing apparatus capable of reading a document image and of processing the read document image, such as a multi function peripheral (MFP), includes a platen, a reading section, an image-forming unit and a display section. The platen holds a document to be scanned. The reading section scans the document on the platen and reads a document image of the document. The image-forming unit prints the document image read by the reading section. The display section displays setup information, such as information on the size and the direction of a sheet. Japanese Patent Laid-Open No. 2005-244755 discloses one such image processing apparatus.

In the aforementioned image processing apparatus, however, it is difficult for an operator to determine which position and direction on the platen the document should be placed from the setup information displayed on the display section. This might cause adverse effects on the usability of the apparatus.

SUMMARY

An object of the application is to improve usability of an image reader, an image processing apparatus or an image forming apparatus.

An image reader includes a platen, a display section and a reading section. The platen holds a document. The display section displays a display image and is mounted to the platen. The reading section reads a document image of the document placed on the platen and is provided in opposition to the platen.

In another aspect, an image processing apparatus includes an image reader which has a platen, a display section and a reading section. The platen holds a document. The display section displays a display image and is located on the platen. The reading section reads a document image of the document placed on the platen and is provided in opposition to the platen.

In another aspect, an image forming apparatus includes an image reader and an image-forming unit. The image reader has a platen, a display section and a reading section. The platen holds a document. The display section displays a display image and is located on the platen. The reading section reads a document image of the document placed on the platen and is provided in opposition to the platen. The image-forming unit performs printing processing on the document image read by the image reader.

A further scope of applicability of the image reader, image processing apparatus and the image forming apparatus will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The image reader, image processing apparatus and image forming apparatus will become more fully understood from the detailed description given herein and the accompanying drawings which are given by way of illustration only, and thus do not limit the invention, and wherein.

DETAILED DESCRIPTION

Preferred embodiments will be described in detail with reference to the accompanying drawings. In each embodiment, the description will be given regarding a multi function peripheral (hereinafter, referred to as "MFP") as an image processing apparatus and as an image forming apparatus.

First Embodiment

Figure 1:
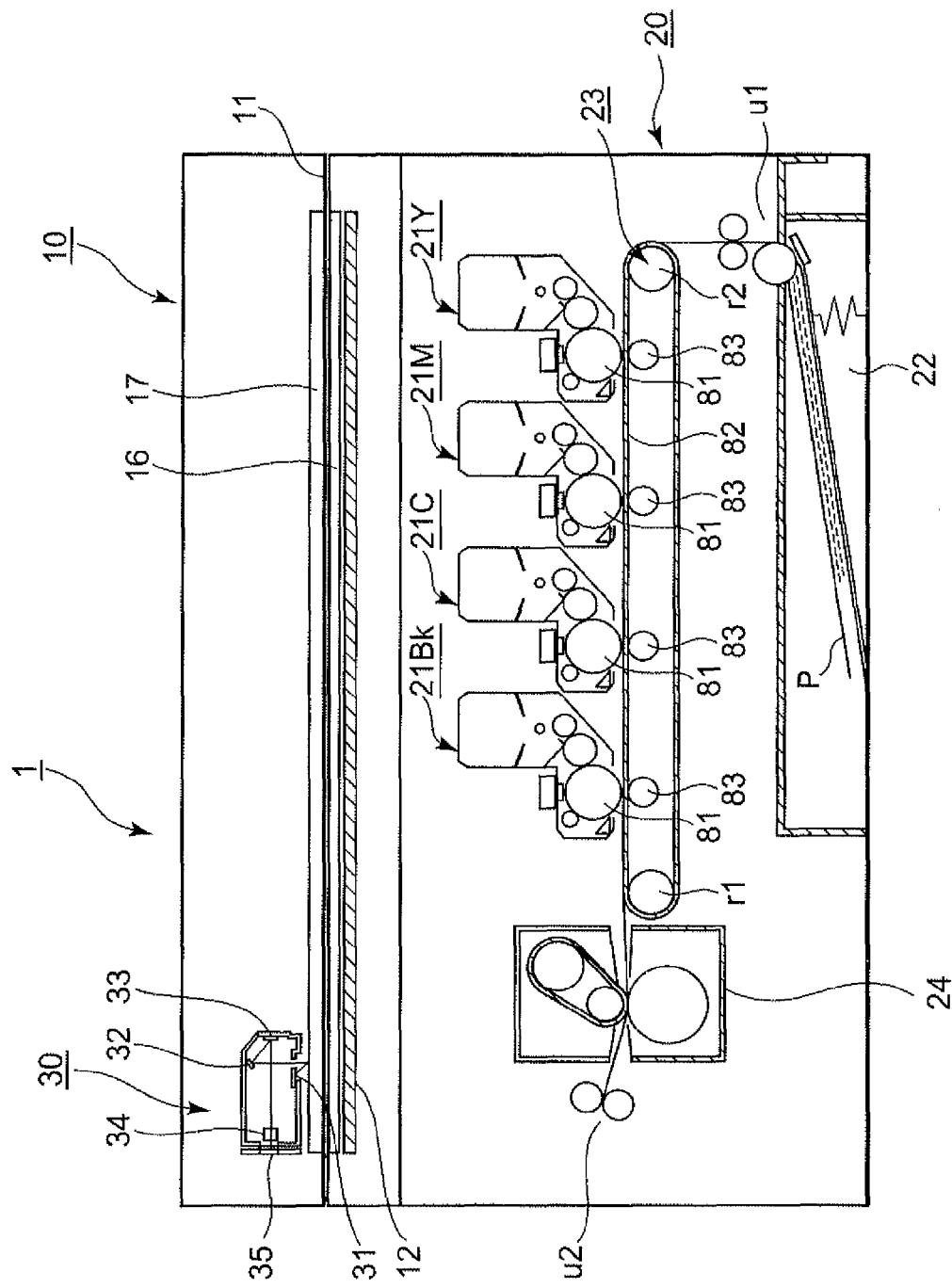
FIG. 1 is a schematic view illustrating a pertinent portion of a multi function peripheral (MFP) according to a first embodiment.

FIG. 1 is a schematic view illustrating a pertinent portion of an MFP 1 according to a first embodiment, which may include an image-reading unit 10 and an image-forming unit 20. The image-reading unit 10, or image reader, may be provided above the image-forming unit 20, which is capable of printing in various colors.

The image-forming unit 20 may include image-forming sections 21Y, 21M, 21C and 21Bk, a sheet cassette 22, a sheet feeding mechanism u1, a transfer section 23, a fixing section 24 and a discharge section u2. The image-forming sections 21Y, 21M, 21C and 21Bk are arranged in series and respectively form a yellow toner image, a magenta toner image, a cyan toner image and a black toner image. The sheet cassette 22, or medium receiving section, accommodates a stack of sheets P (media P), and the sheet feeding mechanism u1 feeds the sheet P from the sheet cassette 22 to the image-forming sections 21Y, 21M, 21C and 21Bk. The transfer section 23 transfers each toner image sequentially on the sheet P to form a color toner image. The fixing section 24 fixes the color toner image transferred to the sheet P by the transfer section 23, onto the sheet P with heat and pressure, thereby forming a color image on the sheet P. The discharge unit u2 discharges the sheet P with the color image thereon, from the image-forming unit 20.

Each of the image-forming sections 21Y, 21M, 21C and 21Bk includes a photosensitive drum 81, or image bearing body. An electrostatic latent image is formed on a surface of the photosensitive drum 81 and is developed with toner, or developer, thus forming the toner image.

The transfer section 23 may include a driving roller r1, a driven roller r2, a transfer belt 82 and transfer rollers 83. The transfer belt 82, or first transfer member, is entrained about the driving roller r1 and the driven roller r2, and is driven by the driving roller r1. Each of the transfer rollers 83, or second transfer members, is disposed in opposition to the photosensitive drum 81 through the transfer belt 82.

Figure 2:
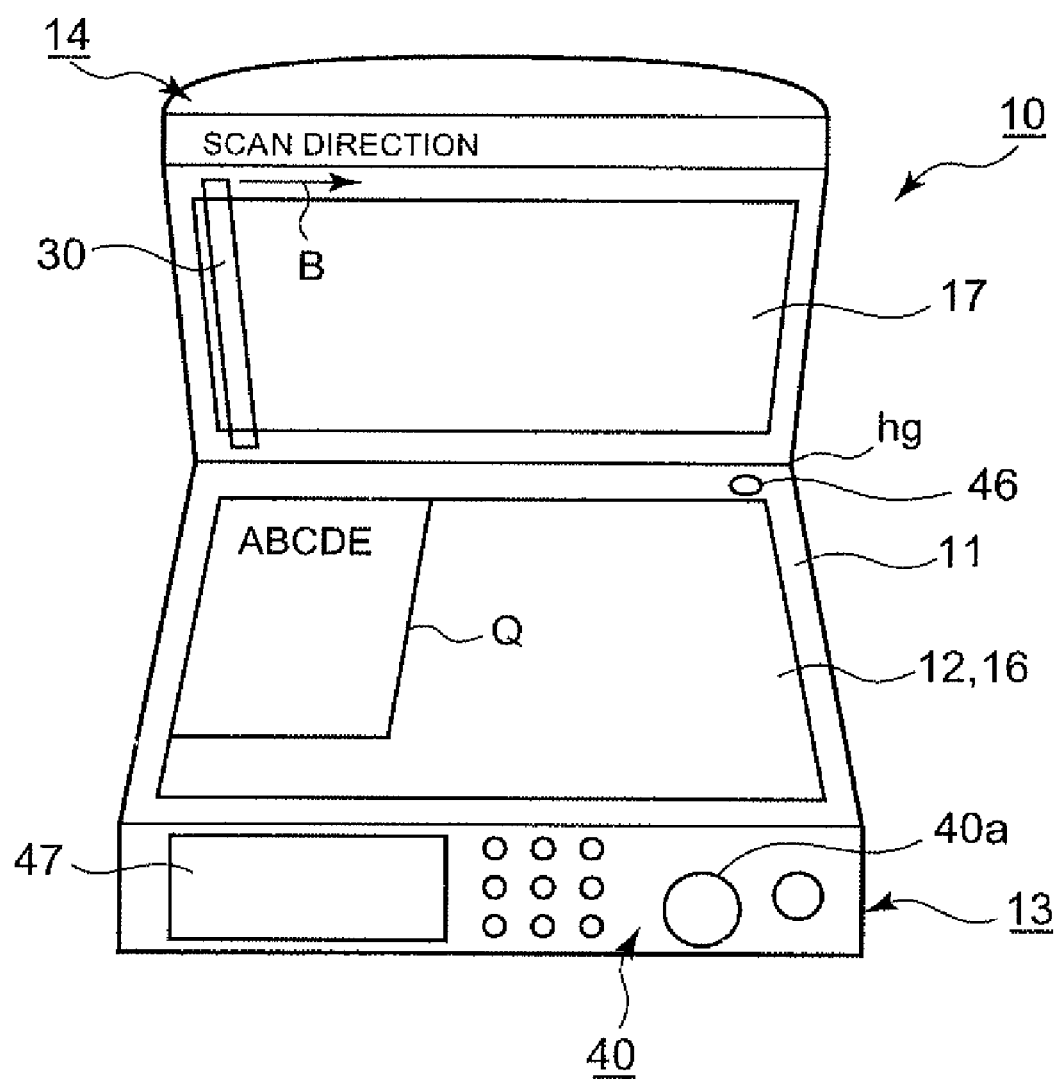
FIG. 2 is a perspective view illustrating an image-reading unit of the first embodiment.
Figure 3:
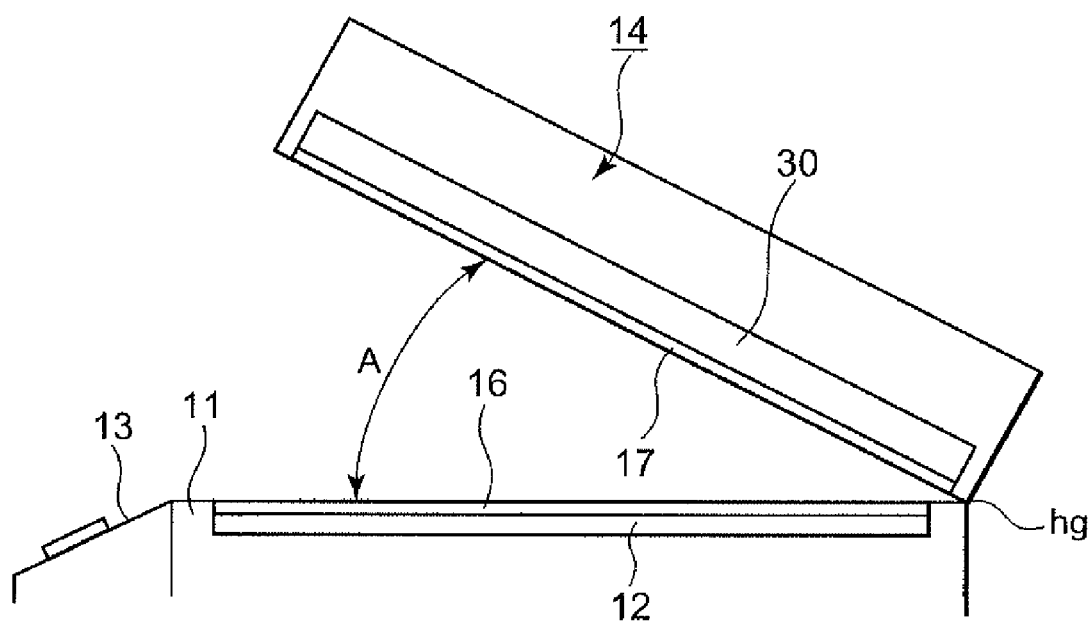
FIG. 3 is a side view illustrating the image-reading unit of the first embodiment.

FIGS. 2 and 3 are respectively a perspective view and a side view illustrating the image-reading unit 10 of the first embodiment, which may include a platen 11, a liquid crystal display section 12, a glass plate 16, an open/close section 14, a glass plate 17, a reading section 30 and an operation device 13. The platen 11 holds a document Q to be scanned, thereon. The liquid crystal display section 12 as a first display section is mounted to the platen 11 and displays a range in which a document image can be read, and the like. The glass platen 16, or first protection plate, protects the liquid crystal display section 12. The open/close section 14 is pivotally mounted to the platen 11 through a hinge hg, which is formed at the rear end of the platen 11, to be rotatable in the direction of arrow A, and holds the document Q placed on the platen 11 tightly together with the platen 11. The glass plate 17, or second protection plate is provided on a bottom surface of the open/close section 14 to face the platen 11. The reading unit 30 is provided on the bottom surface of the open/close section 14 to face the platen 11 and to be movable back and forth and reads a document image of the document Q by scanning a surface of the document Q in a scan direction shown by arrow B. The operation device 13 may be used when an operator sets reading conditions and provides a reading start instruction. In addition, the image-reading unit 10 may also include an open/close detector 46. The open/close detector 46 is disposed on the platen 11 in the vicinity of the hinge hg to detect an open state and a closed state of the open/close section 14.

The reading section 30 exposes the document Q on the platen 11 to light with a light source 31. A lens 34 focuses the light, which is reflected from a surface of the document Q and is further reflected from surfaces of mirrors 32 and 33, or reflecting members. A CCD image sensor 35, or photoelectric conversion element, receives the focused light and generates a voltage-level signal corresponding to the amount of the focused light. The CCD image sensor 35 outputs the voltage-level signal as read image data.

The operation device 13 may include an operation section 40 and a display section 47. The operation section 40 may have various kinds of keys and buttons operated by the operator. The display section 47, or second display section, may display operational procedures and detail of settings to inform the operator when the operator sets reading conditions for the document Q and provides a reading start instruction through the operation section 40. The operation section 40 may also include a start key 40a through which the operator provides the reading start instruction to the image-reading unit 10.

Figure 4:
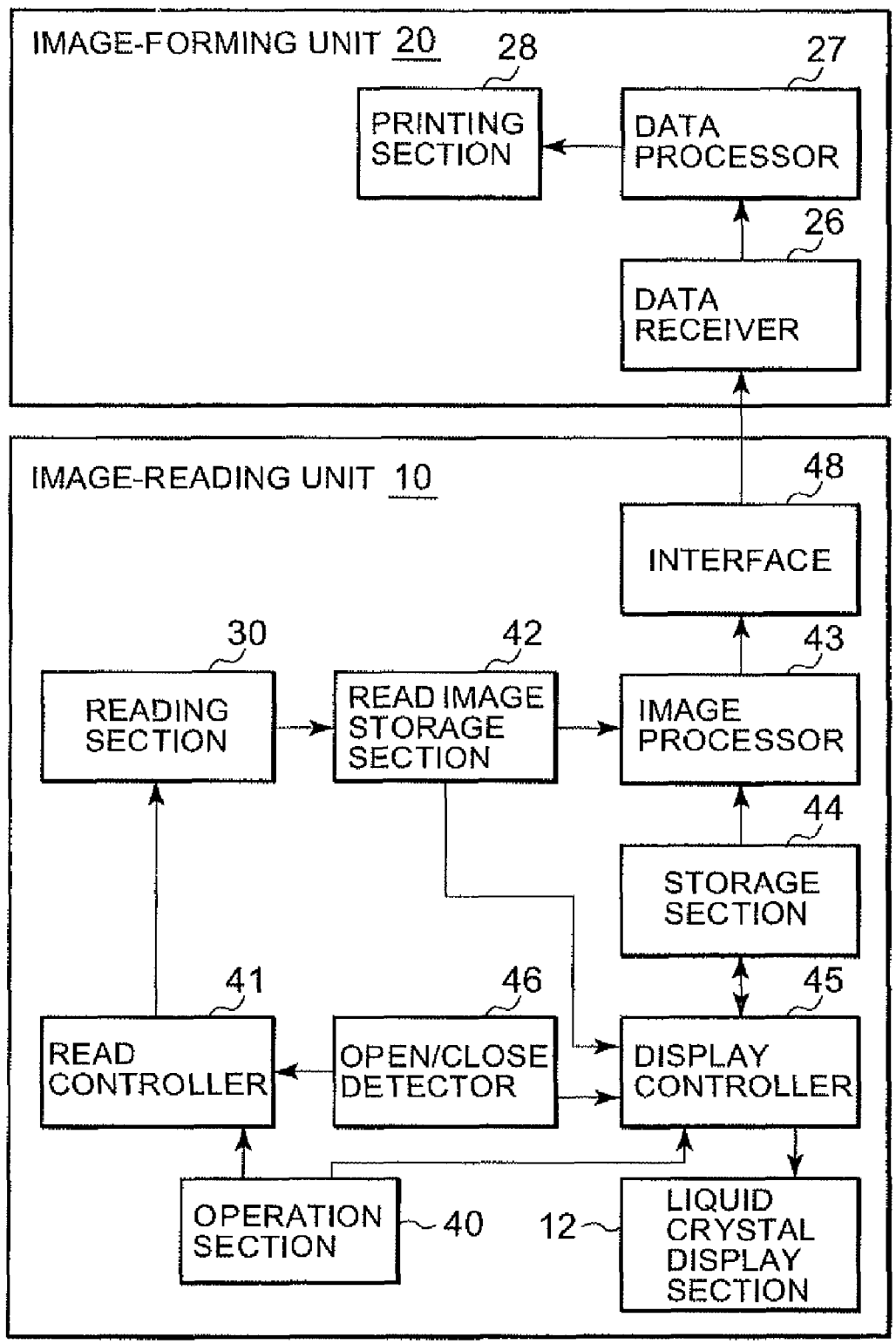
FIG. 4 is a block diagram illustrating a control system of the MFP of the first embodiment.

FIG. 4 is a block diagram illustrating a control system of the MFP 1 of the first embodiment. Referring to FIG. 4, the image-reading unit 10 may include the liquid crystal display section 12, the reading section 30, the operation section 40, a read controller 41, a read image storage section 42, an image processor 43, a storage section 44, a display controller 45, the open/close detector 46 and an interface 48. A control system for the image-reading unit 10 may be configured with the read controller 41, the read image storage section 42, the image processor 43, the storage section 44 and the display controller 45. The image-forming unit 20 may include a data receiver 26, a data processor 27 and a printing section 28. A control system for the image-forming unit 20 may be configured with the data receiver 26 and the data processor 27.

Next, operations of the MFP 1 according to the first embodiment will be described.

First, an image reading operation of the image-reading unit 10 will be described.

Figure 5:
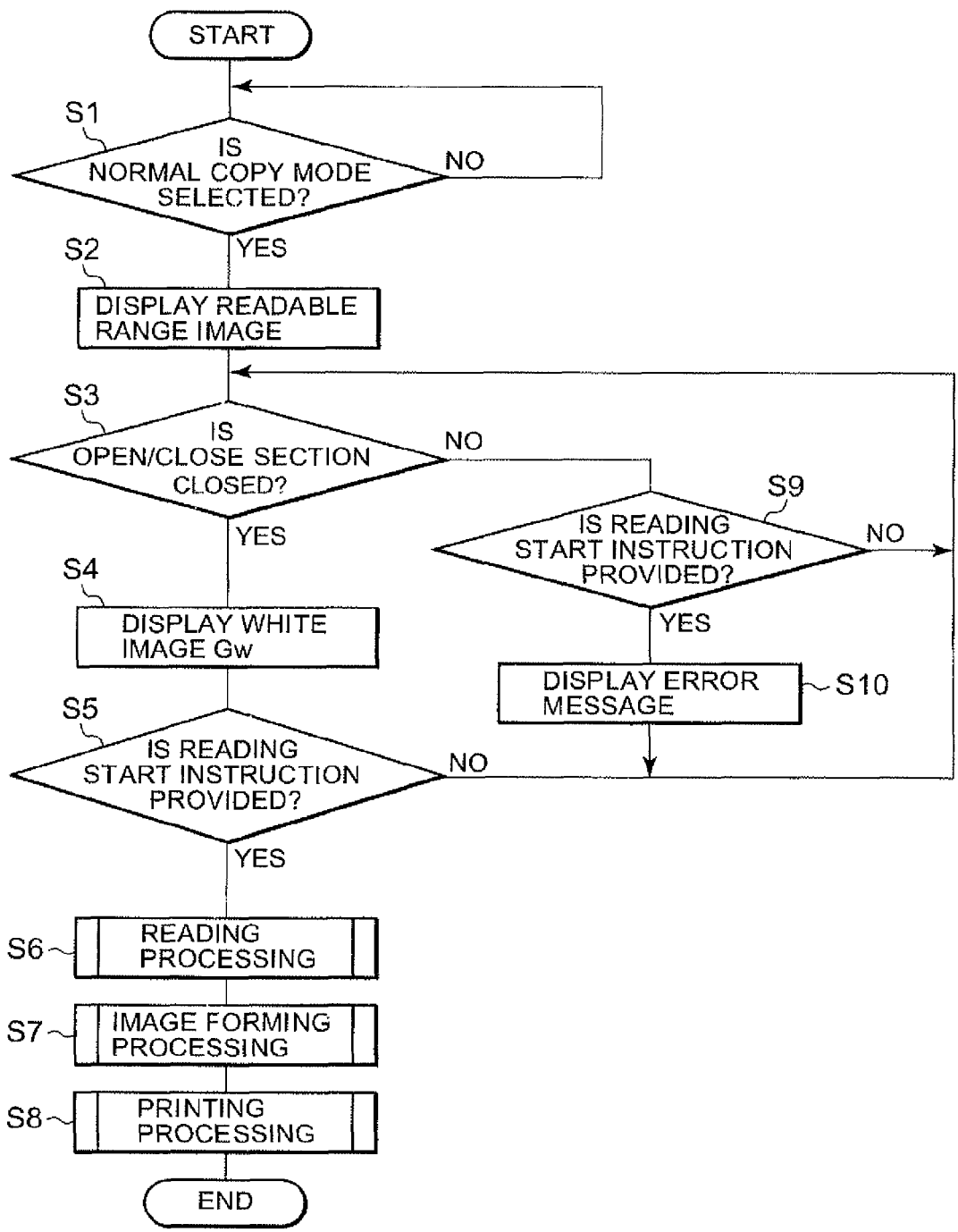
FIG. 5 is a flow chart illustrating an image reading operation of the MFP of the first embodiment.
Figure 6:
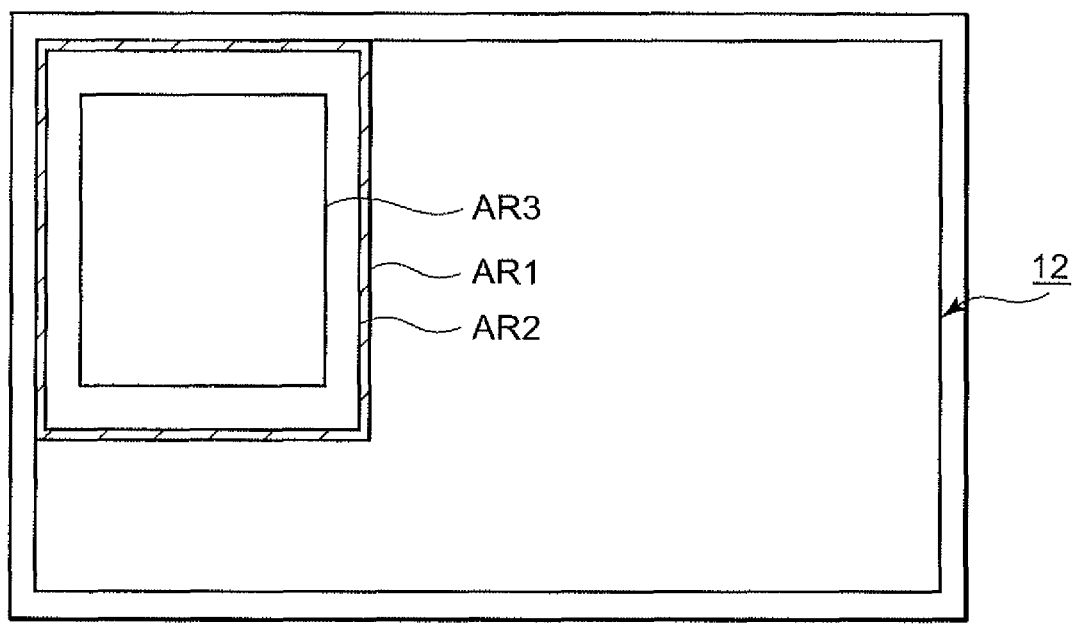
FIG. 6 is a plan view illustrating an example of display images displayed on a liquid crystal display section at the time of the image reading operation of the first embodiment.

FIG. 5 is a flow chart illustrating the image reading operation of the MFP 1 of the first embodiment. FIG. 6 is a plan view illustrating an example of display images displayed on the liquid crystal display section 12 at the time of the image reading operation of the first embodiment.

Referring to FIG. 5, when an operator selects a normal copy mode through the operation section 40 of the operation device 13, the display controller 45 retrieves region image data as display image data from the storage section 44 and displays region images, such as a size region image (a sheet size image) AR1 and a printable region image AR2 of the sheet P, on the liquid crystal display section 12 as shown in FIG. 6.

Then, when the operator provides an instruction to display a readable range image of the document Q through the operation section 40, the display controller 45 retrieves another region image data, designating the readable range of the document Q, from the storage section 44 and displays a readable range image AR3 on the liquid crystal display section 12.

Then, the display controller 45 receives an output signal from the open/close detector 46 and determines whether or not the open/close section 14 is closed based on the output signal. The display controller 45 displays a predetermined image on the liquid crystal display section 12 when the display controller 45 determines the open/close section 14 is closed. For example, when the operator places the document Q on the platen 11 and closes the open/close section 14, the display controller 45 determines that the open/close section 14 is closed. The display controller 45 displays a background image Gw as a display image, which can improve the reading accuracy of the document Q, on the entire surface of the liquid crystal display section 12. The background image Gw may be a white image stored in the storage section 44 in advance.

When the operator presses the start key 40a of the operation section 40 to provide a reading start instruction, the display controller 45 determines whether or not the open/close section 14 is closed. When the display controller 45 determines the open/close section 14 is closed, the read controller 41 operates the reading section 30 to perform reading processing. The reading section 30 scans a surface of the document Q placed on the platen 11, thereby reading a document image of the document Q.

The document image read by the reading section 30 is stored as document image data in the read image storage section 42. The image processor 43 retrieves the document image data from the read image storage section 42 and performs image forming processing on the document image data to convert the document image data into predetermined print data. Then, the image processor 43 transmits the print data to the image-forming unit 20 through the interface 48.

When the data receiver 26 of the image-forming unit 20 receives the print data from image-reading unit 10, the data processor 27 forms a print image based on the print data and the printing section 28 performs printing processing on the print image.

In addition, if the open/close section 14 is still opened when the operator presses the start key 40a to provide the reading start instruction, the display controller 45 displays an error message on the display section 47 in order to instruct the operator to close the open/close section 14.

Next, the flow chart in FIG. 5 will be described.

In step S1, selection of a normal copy mode is expected. When the normal copy mode is selected, the process proceeds to step S2.

In step S2, the readable range image AR3 is displayed.

In step S3, it is determined whether or not the open/close section 14 is closed. The process proceeds to step S4 when the open/close section 14 is closed. On the other hand, the process proceeds to step S9 when the open/close section 14 is not closed.

In step S4, the white image Gw is displayed.

In step S5, it is determined whether or not a reading start instruction has been provided. The process proceeds to step S6 when the reading start instruction has been provided. On the other hand, the process returns to step S3 when the reading start instruction has not been provided.

In step S6, reading processing is performed.

In step S7, image forming processing is performed.

In step S8, printing processing is performed.

In step S9, it is determined whether or not a reading start instruction has been provided. The process proceeds to step S10 when the reading start instruction has been provided. On the other hand, the process returns to step S3 when the reading start instruction has not been provided.

In step S10, an error message is displayed and the process returns to step S3.

Next, an image synthesis reading operation of the image-reading unit 10 will be described.

Figure 7:
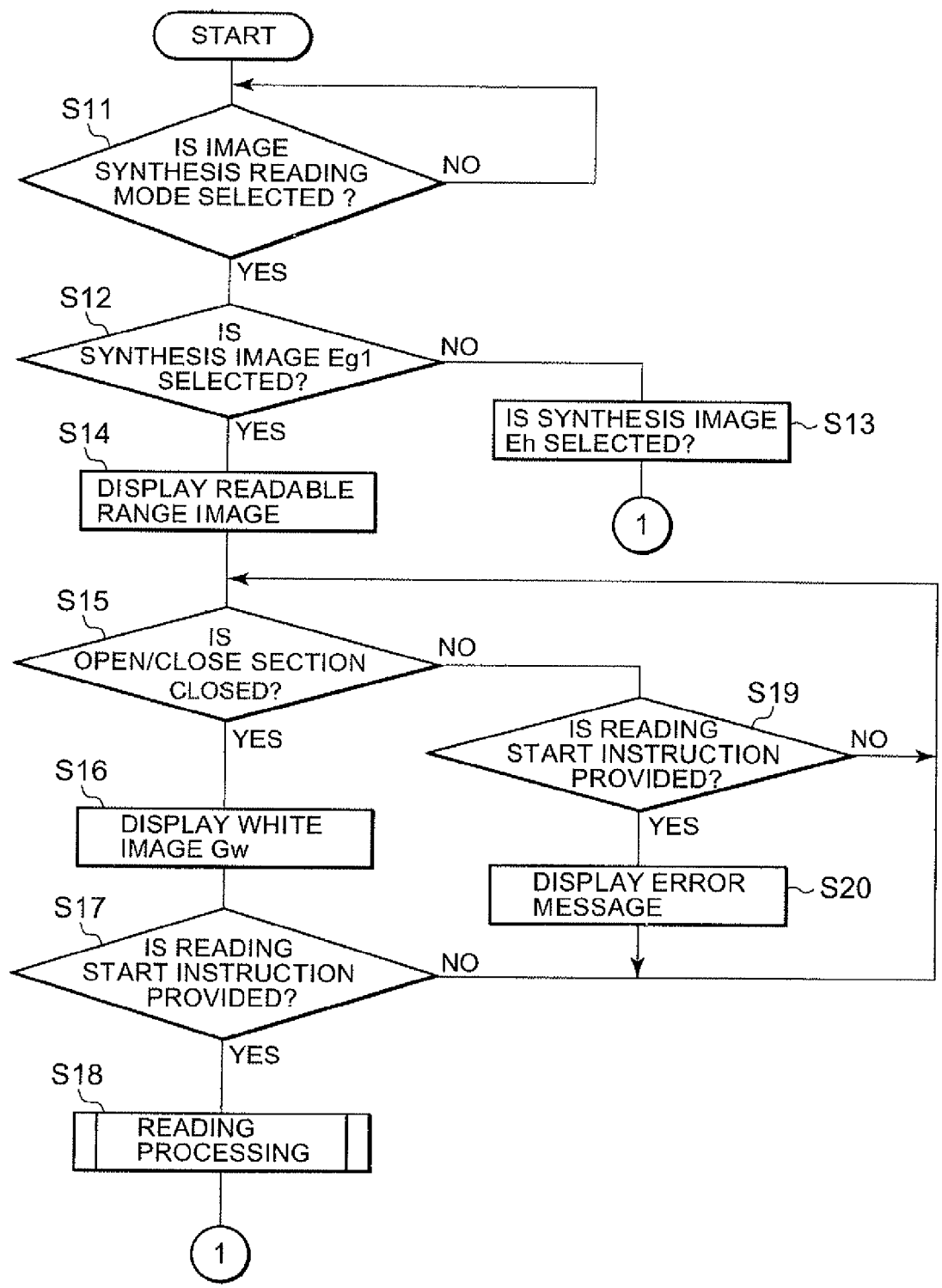
FIG. 7 is a first flow chart illustrating an image synthesis reading operation of the MFP of the first embodiment.
Figure 8:
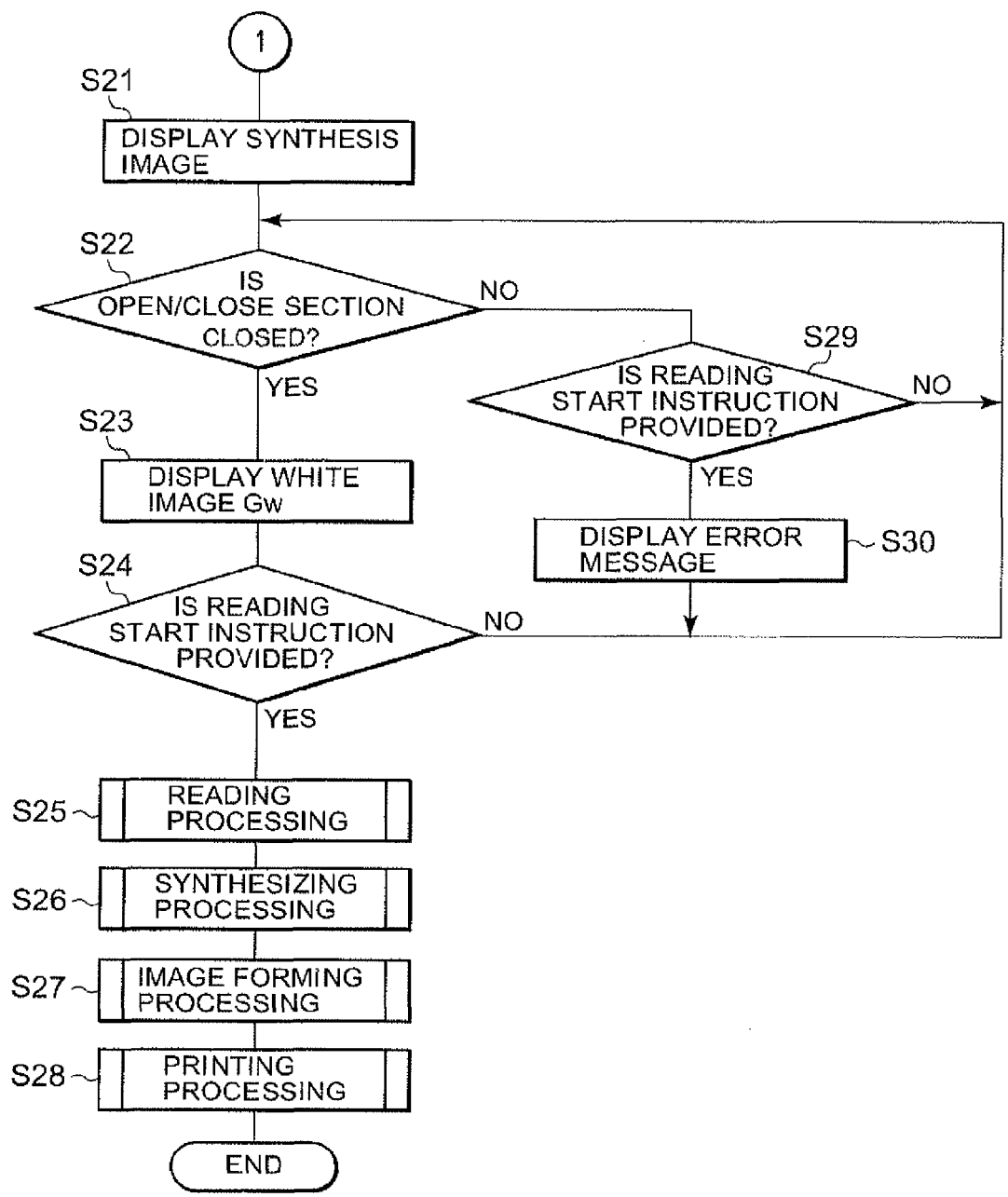
FIG. 8 is a second flow chart illustrating the image synthesis reading operation of the MFP of the first embodiment.
Figure 9:
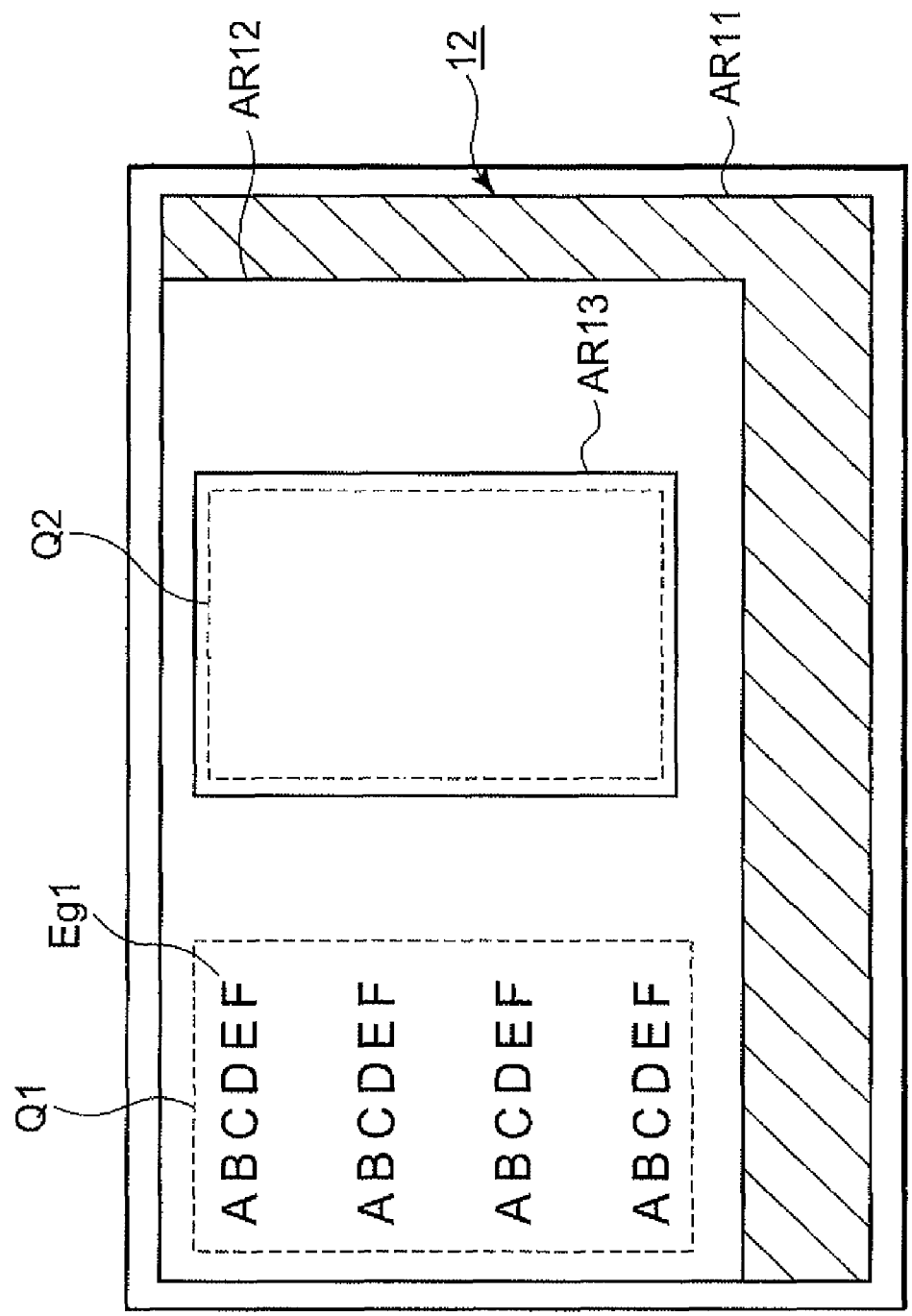
FIG. 9 is a plan view illustrating an example of display images displayed on the liquid crystal display section at the time of the image synthesis reading operation of the first embodiment.

FIGS. 7 and 8 are respectively a first flow chart and a second flow chart illustrating the image synthesis reading operation of the MFP 1 of the first embodiment. FIG. 9 is a plan view illustrating an example of display images displayed on the liquid crystal display section 12 at the time of the image synthesis reading operation of the first embodiment.

Referring to FIG. 7, when an operator selects an image synthesis reading mode through the operation section 40 of the operation device 13, the display controller 45 displays predetermined inquiry information on the display section 47. The inquiry information requests the operator to select either a synthesis image Eg1 or a synthesis image Eh. The synthesis image Eg1 is a document image of a document Q1 that is to be read by the image-reading unit 10. The synthesis image Eh is a document image that has been stored in the storage section 44 in advance.

When the operator selects the synthesis image Eg1 to be used for synthesizing, the display controller 45 retrieves region image data as display image data from the storage section 44 and displays region images, such as a size region image (a sheet size image) AR11 and a printable region image AR12 of the sheet P, on the liquid crystal display section 12 as shown in FIG. 9.

Then, when the operator provides an instruction to display a readable range image of the document Q1 through the operation section 40, the display controller 45 retrieves another region image data, designating the readable range of the document Q1, from the storage section 44 and displays the readable range image AR13 on the liquid crystal display section 12.

Then, the display controller 45 receives an output signal from the open/close detector 46 and determines whether or not the open/close section 14 is closed based on the output signal. The display controller 45 displays a predetermined image on the liquid crystal display section 12 when the display controller 45 determines the open/close section 14 is closed. For example, when the operator places the document Q1 on the platen 11 and closes the open/close section 14, the display controller 45 determines that the open/close section 14 is closed. The display controller 45 displays a background image Gw as a display image, which can improve the reading accuracy of the document Q1, on the entire surface of the liquid crystal display section 12. The background image Gw may be a white image stored in the storage section 44 in advance.

When the operator presses the start key 40a of the operation section 40 to provide a reading start instruction, the display controller 45 determines whether or not the open/close section 14 is closed. When the display controller 45 determines the open/close section 14 is closed, the read controller 41 operates the reading section 30 to perform reading processing. The reading section 30 scans a surface of the document Q1 placed on the platen 11, thereby reading a document image of the document Q1. The document image read by the reading section 30 is stored as the synthesis image Eg1 in the storage section 44.

Subsequently, the display controller 45 retrieves the synthesis image Eg1 from the storage section 44 and displays the synthesis image Eg1 on the liquid crystal display section 12 as shown in FIG. 9.

The operator places a document Q2 at any position within the readable range image AR13, which is displayed at a predetermined location within the printable region image AR12, while referring to the synthesis image Eg1 displayed on the liquid crystal display section 12. After having placed the document Q2 on the platen 11, the operator closes the open/close section 14.

Then, the display controller 45 receives an output signal from the open/close detector 46 and determines whether or not the open/close section 14 is closed based on the output signal. The display controller 45 displays a predetermined image on the liquid crystal display section 12 when the display controller 45 determines the open/close section 14 is closed. For example, when the operator places the document Q2 on the platen 11 and closes the open/close section 14, the display controller 45 determines that the open/close section 14 is closed. The display controller 45 displays a background image Gw as a display image, which can improve the reading accuracy of the document Q2, on the entire surface of the liquid crystal display section 12. The background image Gw may be a white image stored in the storage section 44 in advance.

When the operator presses the start key 40a of the operation section 40 to provide a reading start instruction, the display controller 45 determines whether or not the open/close section 14 is closed. When the display controller 45 determines the open/close section 14 is closed, the read controller 41 operates the reading section 30 to perform reading processing. The reading section 30 scans a surface of the document Q2 placed on the platen 11, thereby reading a document image of the document Q2.

The image processor 43 synthesizes the document image of the document Q2 read by the reading section 30 and the synthesis image Eg1 to form a synthesized image and stores the synthesized image in the read image storage section 42 as synthesized image data. The image processor 43 retrieves the synthesized image data from the read image storage section 42 and performs image forming processing on the synthesized image data to convert the synthesized image data into predetermined print data. The image processor 43 transmits the print data to the image-forming unit 20 through the interface 48.

When the data receiver 26 of the image-forming unit 20 receives the print data from image-reading unit 10, the data processor 27 forms a print image based on the print data and the printing section 28 performs printing processing on the print image.

The synthesized image data may represent, for example, an image that combines synthesis image Eg1 and the document image of the document Q2 in a side-by-side relationship. Thus, the resulting synthesized image includes synthesis image Eg1 adjacent to the image of the document Q2. Consequently, a user can make a combined image from two original images, and the combined image can be printed on one document.

In addition, if the open/close section 14 is still opened when the operator presses the start key 40a to provide the reading start instruction, the display controller 45 displays an error message on the display section 47 in order to instruct the operator to close the open/close section 14.

On the other hand, when the operator selects the synthesis image Eh that has been stored in the storage section 44 in advance, the display controller 45 retrieves the synthesis image Eh from the storage section 44 and displays the synthesis image Eh on the liquid crystal display section 12 like the synthesis image Eg1 as shown in FIG. 9.

Similar to the case of the synthesis image Eg1, the operator places a document Q2 at any position within the readable range image AR13, which is displayed at a predetermined location within the printable region image AR12, while referring to the synthesis image Eh displayed on the liquid crystal display section 12. When the operator closes the open/close section 14 and presses the start key 40a to provide a reading start instruction, the read controller 41 performs reading processing. The image processor 43 synthesizes the document image of the document Q2 read by the reading section 30 and the synthesis image Eh to form a synthesized image and stores the synthesized image in the read image storage section 42 as synthesized image data.

A plurality of synthesis images Eh may be stored in the storage section 44 in advance so that the operator can select one of the synthesis images Eh according to the his/her preference.

Next, the flow charts in FIGS. 7 and 8 will be described.

In step S11, selection of an image synthesis reading mode is expected. When the image synthesis reading mode is selected, the process proceeds to step S12.

In step S12, it is determined whether or not the synthesis image Eg1, which is to be read by the image-reading unit 10, has been selected. The process proceeds to step S14 when the synthesis image Eg1 has been selected. On the other hand, the process proceeds to step S13 when the synthesis image Eg1 has not been selected.

In step S13, the synthesis image Eh, which has been stored in the storage section 44 in advance, is selected.

In step S14, a readable range image is displayed.

In step S15, it is determined whether or not the open/close section 14 is closed. The process proceeds to step S16 when the open/close section 14 is closed. On the other hand, the process proceeds to step S19 when the open/close section 14 is not closed.

In step S16, the white image Gw is displayed.

In step S17, it is determined whether or not a reading start instruction has been provided. The process proceeds to step S18 when the reading start instruction has been provided. On the other hand, the process returns to step S15 when the reading start instruction has not been provided.

In step S18, reading processing is performed.

In step S19, it is determined whether or not the reading start instruction has been provided. The process proceeds to step S20 when the reading start instruction has been provided. On the other hand, the process returns to step S15 when the reading start instruction has not been provided.

In step S20, an error message is displayed and the process returns to step S15.

In step S21, the synthesis image Eg1 or the synthesis image Eh is displayed.

In step S22, it is determined whether or not the open/close section 14 is closed. The process proceeds to step S23 when the open/close section 14 is closed. On the other hand, the process proceeds to step S29 when the open/close section 14 is not closed.

In step S23, the white image Gw is displayed.

In step S24, it is determined whether or not a reading start instruction has been provided. The process proceeds to step S25 when the reading start instruction has been provided. On the other hand, the process returns to step S22 when the reading start instruction has not been provided.

In step S25, reading processing is performed.

In step S26, synthesizing processing is performed.

In step S27, image forming processing is performed.

In step S28, printing processing is performed.

In step S29, it is determined whether or not the reading start instruction has been provided. The process proceeds to step S30 when the reading start instruction has been provided. On the other hand, the process returns to step S22 when the reading start instruction has not been provided.

In step S30, an error message is displayed and the process returns to step S22.

Thus, in the first embodiment, the size region image AR1 and the printable region image AR2 of the sheet P, and the readable range image AR3, which serve as indicators when the operator places the document Q (Q1 and Q2) on the platen 11, are displayed on the liquid crystal display section 12. Moreover, the reading section 30 is provided in opposition to the platen 11 and reads a document image of the document Q on the platen 11. Therefore, an operator can easily and intuitively determine the position and direction in which the document should be placed on the platen 11. In addition, since the operator can easily adjust the position and direction where the document Q is placed, the document image of the document Q can be appropriately read even if the document Q is irregular in size. Moreover, when the image synthesis reading operation is performed, the operator can easily adjust the layout of a synthesized image before the start of reading.

Second Embodiment

Next, a second embodiment will be described. The second embodiment differs from the first embodiment in that an image-reading unit 210 is used in place of the image-reading unit 10. Elements similar to those in the first embodiment have been given the same numerals and their description is omitted.

Figure 10:
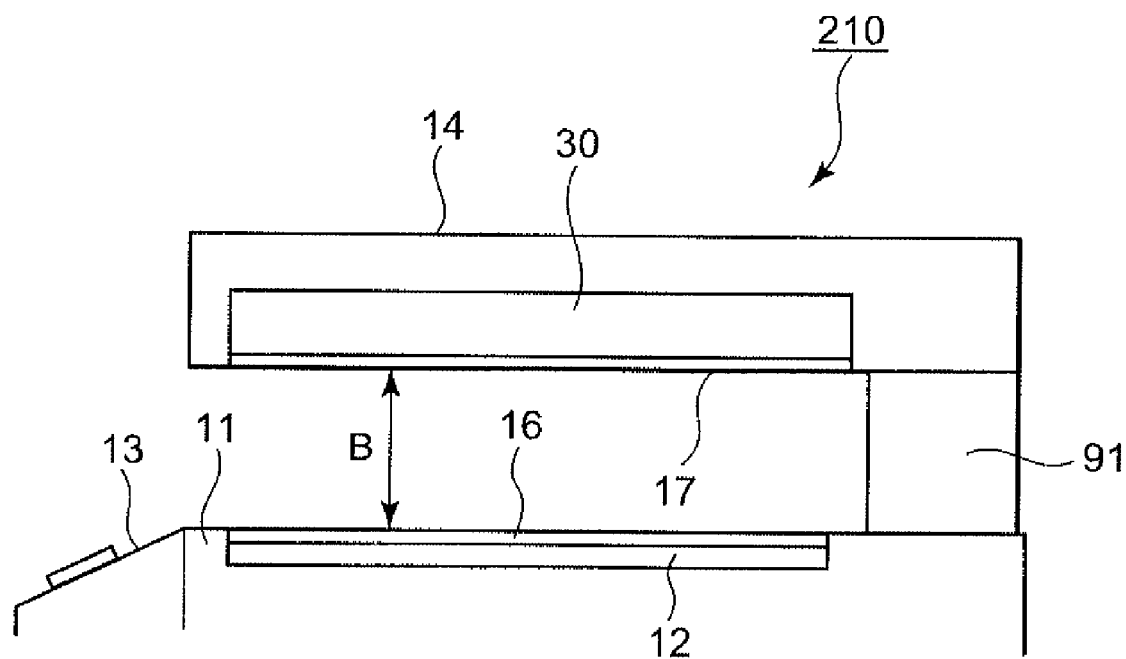
FIG. 10 is a side view illustrating an image-reading unit of a second embodiment.

FIG. 10 is a side view illustrating the image-reading unit 210 of the second embodiment, in which the hinge hg of the image-reading unit 10 in the first embodiment (FIGS. 2 and 3) is replaced with an up-and-down mechanism 91. The up-and-down mechanism 91 is provided at the rear end of the platen 11 and supports the open/close section 14 so that the open/close section 14 can move up and down in the direction of arrow B. Therefore, even if a document Q is great in thickness, such as a book, the bottom surface of the open/close section 14 is maintained parallel with a surface of the document Q, which improves the reading accuracy of the document Q.

Third Embodiment

Next, a third embodiment will be described. The third embodiment differs from the first embodiment in that an image-reading unit 310 (See FIG. 12) is used in place of the image-reading unit 10. Elements similar to those in the first and second embodiments have been given the same numerals and their description is omitted.

Figure 11:
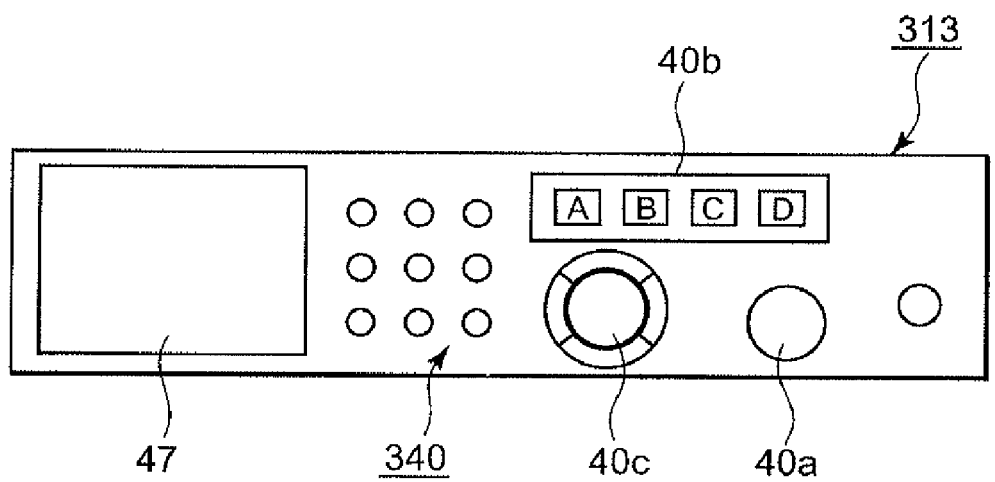
FIG. 11 is a schematic view illustrating an operation device of a third embodiment.

FIG. 11 is a schematic view illustrating an operation device 313 of the third embodiment, in which an operation section 340 also includes a cursor selection key 40b and a cursor movement key 40c in addition to the start key 40a of the image-reading unit 10 in the first embodiment (FIG. 2). The cursor selection key 40b is used for selecting cursor A, B, C or D. The cursors A, B, C and D, or extraction region images, designate a region of a document Q to be extracted. The region is defined as an extraction region. The cursor movement key 40c moves the cursors A, B, C and D. The extraction region image configured by each of the cursors A, B, C and D is a kind of display image.

Figure 12:
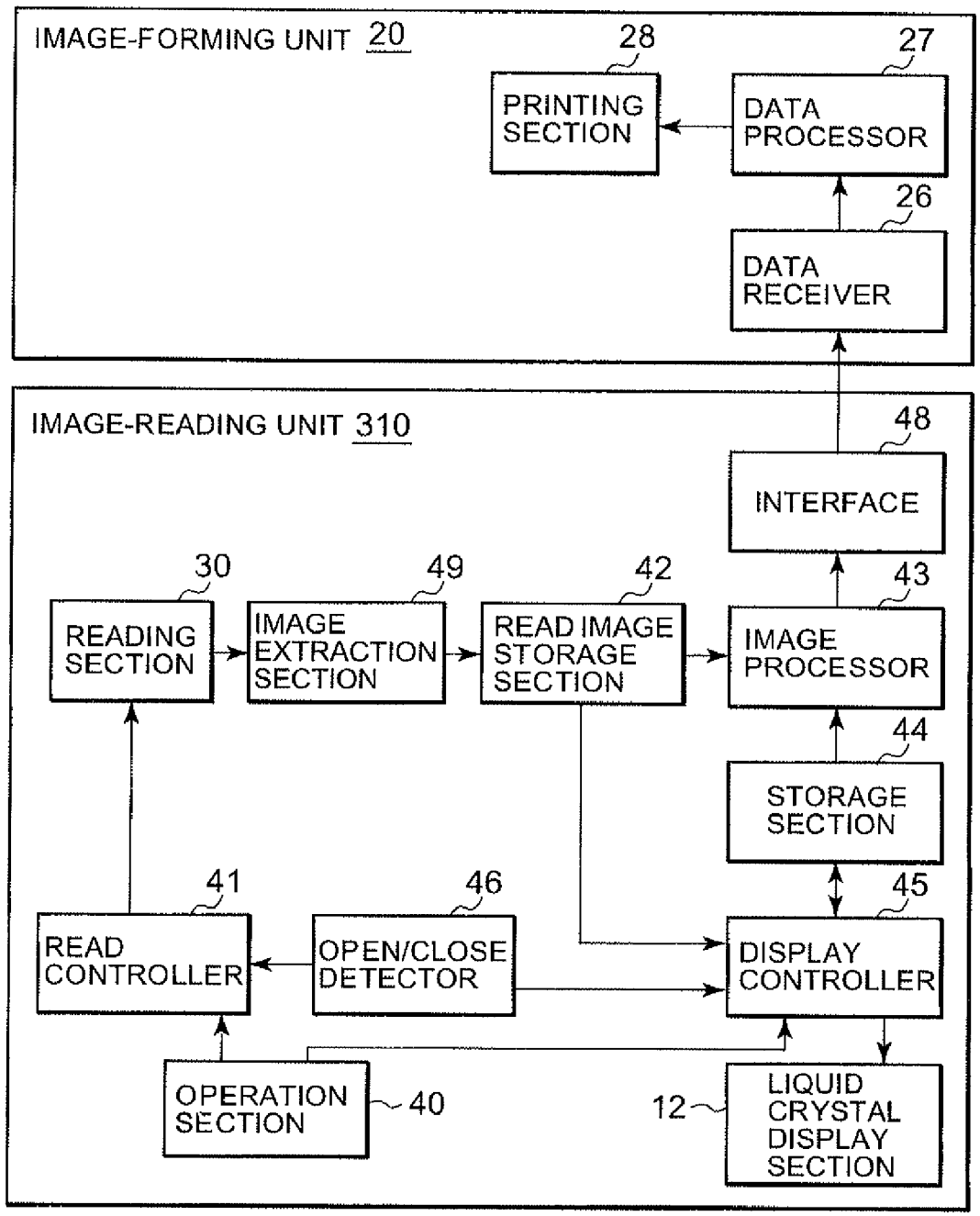
FIG. 12 is a block diagram illustrating a control system of the MFP of the third embodiment.

FIG. 12 is a block diagram illustrating a control system of the MFP 1 of the third embodiment. Referring to FIG. 12, the image-reading unit 310 may also include an image extraction section 49 in addition to the elements of the image-reading unit 10 in the first embodiment (FIG. 4). When the operator selects the cursor A, B, C or D using the cursor selection key 40b and moves them using the cursor movement key 40c, the image extraction section 49 extracts a document image within the extraction region, designated by the cursors A, B, C and D, of the document Q read by the reading section 30.

Next, the operation of the MFP 1 according to the third embodiment will be described.

Figure 13:
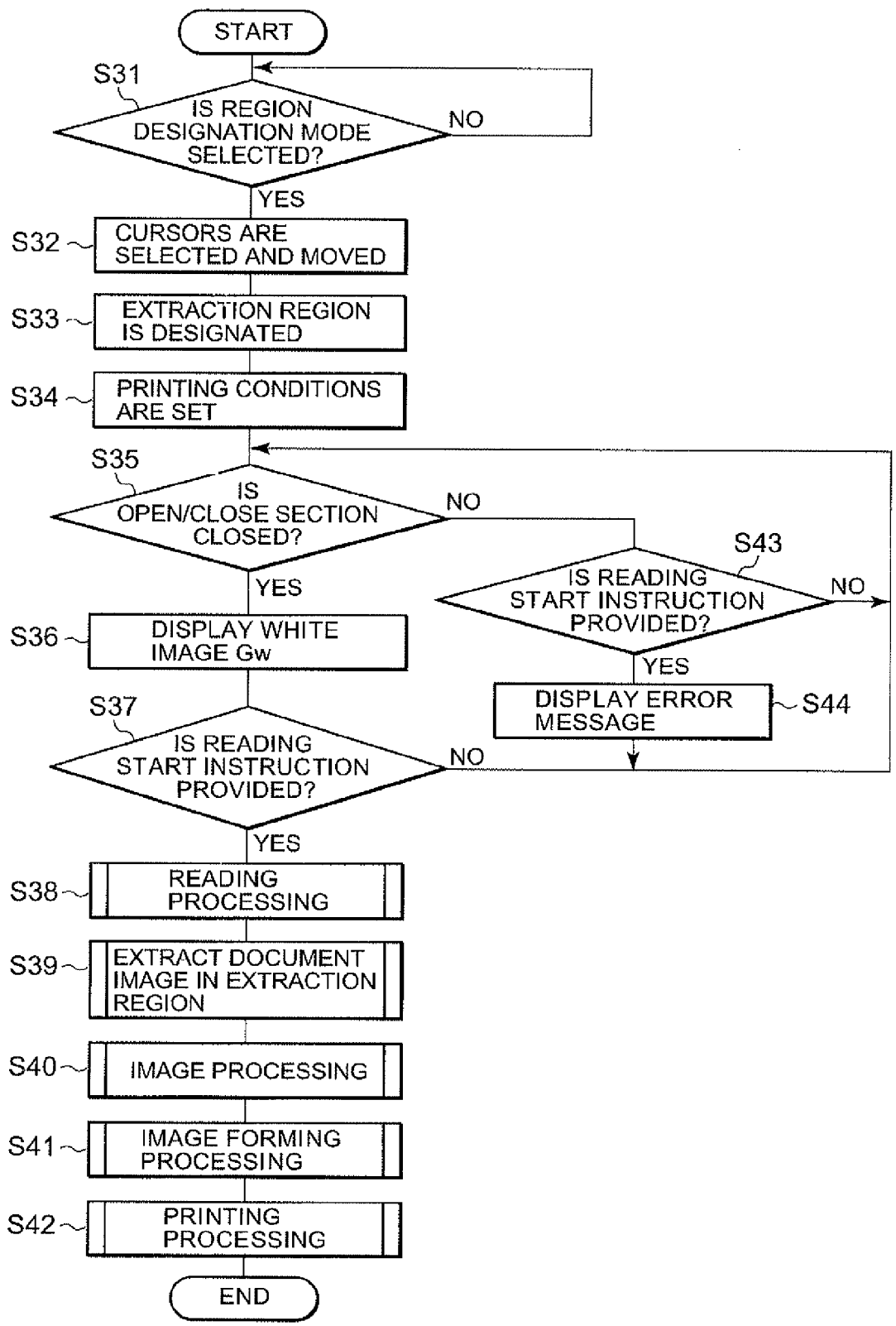
FIG. 13 is a flow chart illustrating an image extraction operation of the MFP of the third embodiment.
Figure 14:
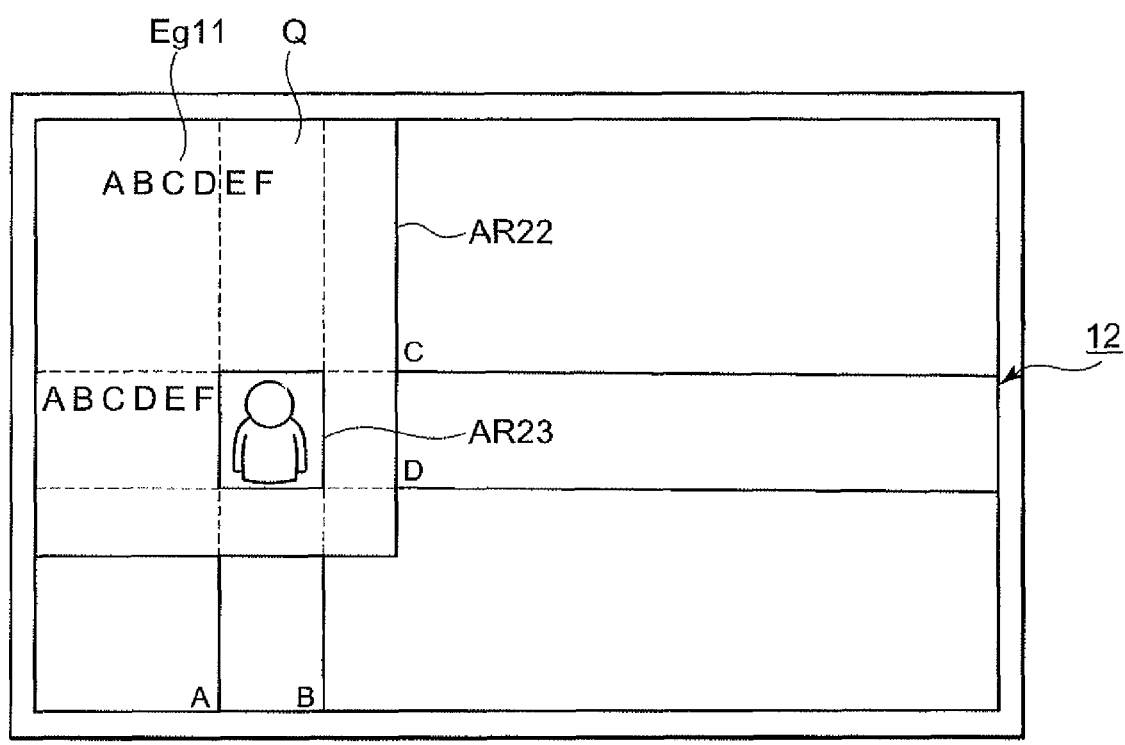
FIG. 14 is a plan view illustrating an example of display images displayed on the liquid crystal display section at the time of the image extraction operation of the third embodiment.

FIG. 13 is a flow chart illustrating the image extraction operation of the MFP 1 of the third embodiment. FIG. 14 is a plan view illustrating an example of display images displayed on the liquid crystal display section 12 at the time of the image extraction operation of the third embodiment.

Referring to FIG. 13, when an operator places a document Q on the platen 11 and selects a region designation mode through the operation section 340 of the operation device 313, the display controller 45 displays the cursors A to D on the liquid crystal display section 12 as shown in FIG. 14. The operator selects one of the cursors A to D that he/she wants to move using the cursor selection key 40b of the operating section 340. Then, the operator moves the selected cursor A, B, C or D to a desired position using the cursor movement key 40c. If the above procedure is repeated for all of the cursors A to D, a desired extraction region AR23 of a document image Eg11 of the document Q can be designated within a printable region image AR22 of a sheet P.

The operator sets printing conditions (settings for enlargement, reduction, position and the like) with respect to a document image in the extraction region AR23 and closes the open/close section 14. The display controller 45 displays a background image Gw as a display image, which can improve the reading accuracy of the document Q, on the entire surface of the liquid crystal display section 12 when the display controller 45 determines the open/close section 14 is closed. The background image Gw may be a white image stored in the storage section 44 in advance.

When the operator presses the start key 40a of the operation section 340 to provide a reading start instruction, the display controller 45 determines whether or not the open/close section 14 is closed. When the display controller 45 determines the open/close section 14 is closed, the read controller 41 operates the reading section 30 to perform reading processing. The reading section 30 scans a surface of the document Q placed on the platen 11, thereby reading an entire document image of the document Q.

Then, the image extraction section 49 performs image extraction processing to extract the document image in the extraction region AR23 from the entire document image of the document Q read by the reading section 30. The extraction section 49 performs image processing on the extracted document image and stores it as document image data in the read image storage section 42.

The image processor 43 retrieves the document image data from the read image storage section 42 and performs image forming processing on the document image data to convert the document image data into predetermined print data. That is, the print data with respect to the document image data in the extraction region AR23 is generated in the same procedure as the normal copy mode. The image processor 43 transmits the print data to the image-forming unit 20 through the interface 48.

When the data receiver 26 of the image-forming unit 20 receives the print data from image-reading unit 310, the data processor 27 forms a print image based on the print data and the printing section 28 performs printing processing on the print image.

Note that the extracted document image in this image extraction operation may also be used as the synthesis image Eg1 and the synthesis image Eh described in the first embodiment.

Next, the flow chart in FIG. 13 will be described.

In step S31, selection of a region designation mode is expected. When the region designation mode is selected, the process proceeds to step S32.

In step S32, the cursors A to D are selected and moved.

In step S33, the extraction region AR23 is designated.

In step S34, printing conditions are set.

In step S35, it is determined whether or not the open/close section 14 is closed. The process proceeds to step S36 when the open/close section 14 is closed. On the other hand, the process proceeds to step S43 when the open/close section 14 is not closed.

In step S36, the white image Gw is displayed.

In step S37, it is determined whether or not a reading start instruction has been provided. The process proceeds to step S38 when the reading start instruction has been provided. On the other hand, the process returns to step S35 when the reading start instruction has not been provided.

In step S38, reading processing is performed.

In step S39, a document image in the extraction region AR23 is extracted.

In step S40, image processing is performed.

In step S41, image forming processing is performed.

In step S42, printing processing is performed.

In step S43, it is determined whether or not the reading start instruction has been provided. The process proceeds to step S44 when the reading start instruction has been provided. On the other hand, the process returns to step S35 when the reading start instruction has not been provided.

In step S44, an error message is displayed and the process returns to step S35.

Thus, in the third embodiment, since an operator can designate the extraction region AR23 while referring to the document image Eg11 of the document Q within the printable region image AR22, a desired document image of the document Q can be appropriately extracted.

Fourth Embodiment

Next, a fourth embodiment will be described. The fourth embodiment differs from the first embodiment in that an image-reading unit 410 is used in place of the image-reading unit 10. Elements similar to those in the first to third embodiments have been given the same numerals and their description is omitted.

Figure 15:
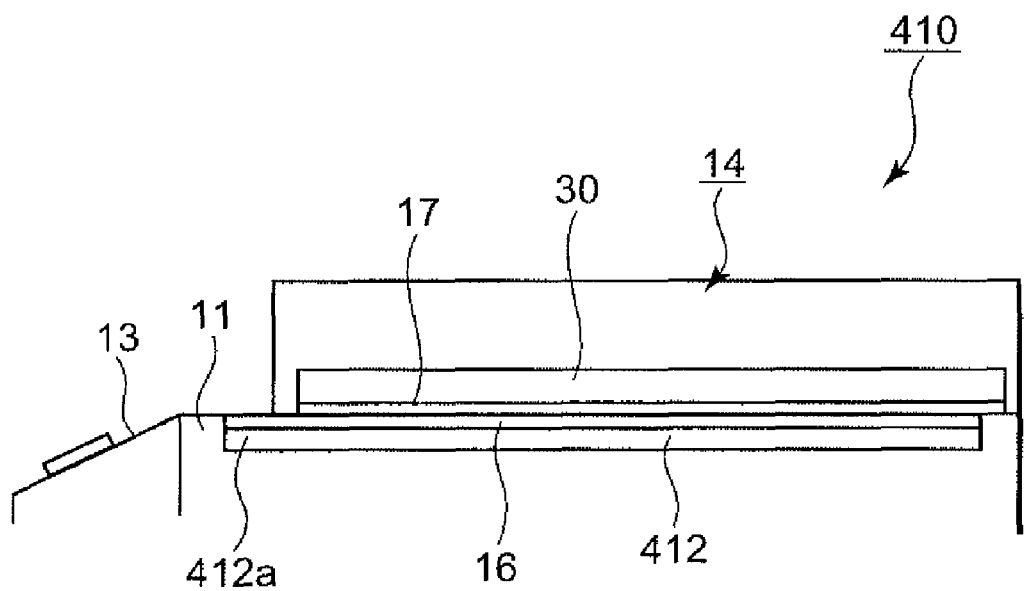
FIG. 15 is a side view illustrating an image-reading unit of a fourth embodiment.

FIG. 15 is a side view illustrating the image-reading unit 410 of the fourth embodiment, in which a part of a liquid crystal display section 412 serves as the display section 47 (FIG. 3). That is, the display section 47 is not provided in the operation device 13, but the part of the liquid crystal display section 412 can operate similarly to the display section 47. Specifically, a display portion 412a of the liquid crystal display section 412, not covered by the open/close section 14 in the vicinity of the operation device 13, serves as the display section 47.

Fifth Embodiment

Next, a fifth embodiment will be described. The fifth embodiment differs from the first embodiment in that a platen 511 is used in place of the platen 11. Elements similar to those in the first to fourth embodiments have been given the same numerals and their description is omitted.

Figure 16:
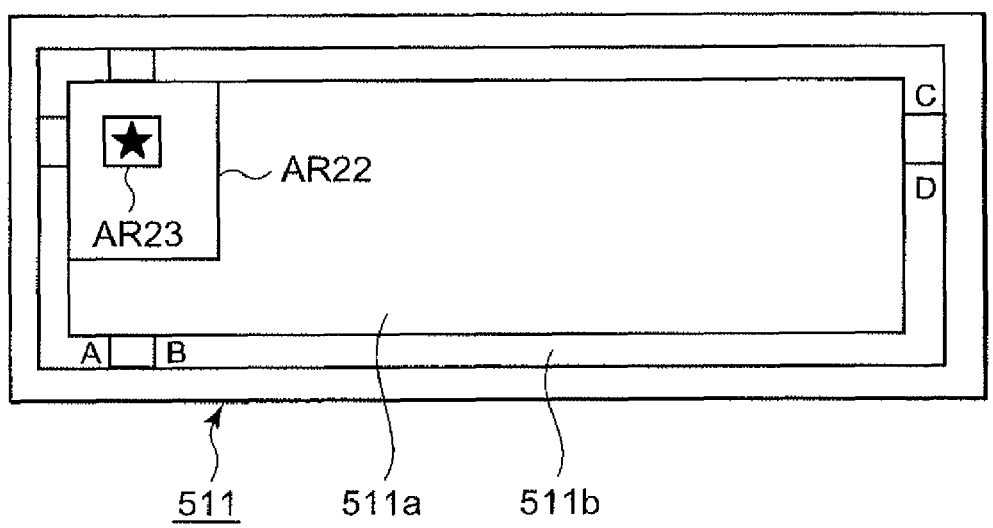
FIG. 16 is a view illustrating an example of display images displayed on a platen at the time of an image extraction operation of a fifth embodiment.

FIG. 16 is a plan view illustrating an example of display images displayed on the platen 511 at the time of an image extraction operation of the fifth embodiment. Referring to FIG. 16, a document placement surface 511a and a display section 511b are incorporated in the platen 511. The document placement surface 511a holds a document Q thereon. The display section 511b is belt-like in shape and is provided so as to surround the document placement surface 511a. Cursors A to D as extraction region images are displayed in the display section 511b. Note that the extraction region image configured by each of the cursors A, B, C and D is a kind of display image.

In each of the embodiments, the image-forming unit 20 may be an image-forming unit that is capable of printing in monochrome. In addition, the image-forming unit 20 may be replaced with a personal computer, which sends a document image read by the image-reading unit 10 (210, 310 or 510) by E-mail, may be replaced with a facsimile machine, which transmits the document image, and may be replaced with a projector, which projects the document image on a screen.

In each of the embodiments, the background image Gw may be a black image, thereby preventing the back side of a document Q from being copied. Moreover, the background image Gw may be a white image or a black image displayed only in a designated region.

The image reader, image processing apparatus and image forming apparatus being thus described, it will be obvious that the same may be varied in many ways. Such variations are not to be regarded as a departure from the sprit and scope of the invention, and all such modifications as would be obvious to one skilled in the art intended to be included within the scope of the following claims.

What is claimed is:

1. An image reader, comprising:
a platen on which a document is placed;
a display section that displays a display image and is located on the platen;
a reading section that reads a document image of the document placed on the platen and is provided in opposition to the platen;
a storage section that stores the display image;
a display controller that displays the display image stored in the storage section on the display section;
an open/close section that incorporates the reading section and is movable relative to the platen; and
an open/close detector that detects an open state and a closed state of the open/close section, wherein
the display image includes a region image that serves as an indicator when the document is placed on the platen and a background image that is displayed when the document image of the document is read by the reading section, and
the display controller switches the region image and the background image according to a detection result of the open/close detector.

2. The image reader according to claim 1, wherein the open/close section is pivotal relative to the platen.

3. The image reader according to claim 1, wherein the open/close section is movable up and down relative to the platen.

4. The image reader according to claim 1, wherein the display controller displays the region image on the display section when the open/close detector detects the open state of the open/close section.

5. The image reader according to claim 1, wherein the display controller displays the background image on the display section when the open/close detector detects the close state of the open/close section.

6. The image reader according to claim 1, further comprising an image processor that synthesizes a plurality of images.

7. The image reader according to claim 6, wherein the display image includes a synthesis image, and the image processor synthesizes the document image and the synthesis image.

8. The image reader according to claim 7, further comprising a storage section that stores the synthesis image.

9. The image reader according to claim 1, further comprising an image extraction section that extracts an image in a predetermined region of the document image read by the reading section.

10. The image reader according to claim 9, wherein the display image includes an extraction region image that designates the predetermined region.

11. The image reader according to claim 1, wherein the display section is an LCD.

12. An image processing apparatus, comprising an image reader, wherein the image reader includes
- a platen on which a document is placed;
- a display section that displays a display image and is located on the platen;
- a reading section that reads a document image of the document placed on the platen and is provided in opposition to the platen;
- a storage section that stores the display image;
- a display controller that displays the display image stored in the storage section on the display section;
- an open/close section that incorporates the reading section and is movable relative to the platen; and
- an open/close detector that detects an open state and a closed state of the open/close section, wherein
- the display image includes a region image that serves as an indicator when the document is placed on the platen and a background image that is displayed when the document image of the document is read by the reading section, and
- the display controller switches the region image and the background image according to a detection result of the open/close detector.

13. The image processing apparatus according to claim 12, wherein the display section is an LCD.

14. An image forming apparatus, comprising: an image reader including,
- a platen on which a document is placed;
- a display section that displays a display image and is located on the platen; and
- a reading section that reads a document image of the document placed on the platen and is provided in opposition to the platen;
- an image-forming unit that performs printing processing on the document image read by the image reader;
- a storage section that stores the display image;
- a display controller that displays the display image stored in the storage section on the display section;
- an open/close section that incorporates the reading section and is movable relative to the platen, and
- an open/close detector that detects an open state and a closed state of the open/close section, wherein
- the display image includes a region image that serves as an indicator when the document is placed on the platen and a background image that is displayed when the document image of the document is read by the reading section, and
- the display controller switches the region image and the background image according to a detection result of the open/close detector.

15. The image forming apparatus according to claim 14, wherein the display section is an LCD.

\* \* \* \* \*